United States Patent [19]
Horizoe et al.

[11] Patent Number: 6,011,187
[45] Date of Patent: Jan. 4, 2000

[54] METHOD AND APPARATUS FOR RECLAIMING OIL FROM WASTE PLASTIC

[75] Inventors: Hirotoshi Horizoe; Takeshi Amari; Hiroshi Nagai; Shizuo Yasuda; Yuji Kaihara; Yoshimasa Kawami; Yasumasa Matsukawa, all of Yokohama, Japan

[73] Assignee: Mitsubishi Heavy Industries, Ltd., Tokyo, Japan

[21] Appl. No.: 08/945,458

[22] PCT Filed: Feb. 27, 1997

[86] PCT No.: PCT/JP97/00572

§ 371 Date: Jan. 8, 1998

§ 102(e) Date: Jan. 8, 1998

[87] PCT Pub. No.: WO97/31990

PCT Pub. Date: Sep. 4, 1997

[30] Foreign Application Priority Data

| Feb. 27, 1996 | [JP] | Japan | ................................ 8-65348 |
| Feb. 27, 1996 | [JP] | Japan | ................................ 8-65371 |
| Feb. 29, 1996 | [JP] | Japan | ................................ 8-69049 |
| Feb. 29, 1996 | [JP] | Japan | ................................ 8-69390 |

[51] Int. Cl.$^7$ ............................. C10G 1/10; C08J 1/16; C10B 1/04

[52] U.S. Cl. ............................ 585/241; 201/2.5; 201/25; 202/84; 202/152; 202/158

[58] Field of Search ..................... 585/241, 240; 201/2.5, 25; 202/84, 152, 158; 196/98

[56] References Cited

U.S. PATENT DOCUMENTS

| 5,326,919 | 7/1994 | Paisley et al. | ........................... 585/241 |
| 5,364,995 | 11/1994 | Kirkwood et al. | ........................ 585/241 |
| 5,608,136 | 3/1997 | Maezawa et al. | ........................ 588/228 |
| 5,639,937 | 6/1997 | Hover et al. | ............................. 585/241 |
| 5,731,483 | 3/1998 | Stabel et al. | ............................. 585/241 |

*Primary Examiner*—Bekir L. Yildirim
*Attorney, Agent, or Firm*—Evenson, McKeown, Edwards & Lenahan, P.L.L.C.

[57] ABSTRACT

This invention provides a method for reclaiming oil from waste plastic in such a way that thermosetting resins and solid foreign matter in the plastic will not pose a problem. This method greatly reduces the burden of presorting the garbage or industrial waste. To achieve this objective when oil is to be reclaimed from a waste plastic containing chlorine compounds, such as vinyl chloride, the plastic must first be stripped of chlorine. Prior to pyrolysis, while being conveyed forward in a continuous stream, the plastic is mixed with heated sand and/or an additive agent to raise its temperature to 250–350° C. This creates a product which is comprised of a mixture of sand and substantially dechlorinated plastic. The product is mixed with heated sand to heat it directly to a temperature of 350–500° C. It is maintained at this temperature until pyrolysis occurs. In order to obtain high-quality oil with a low boiling point, a first gas/liquid separation process separates the product obtained from the aforesaid pyrolysis into liquid high-boiling point oil, gaseous low-boiling point oil and low molecular-weight gases, and recirculates the liquid high-boiling point oil to the pyrolysis process, and a second gas/liquid separation process separates the gaseous low-boiling point oil and low molecular-weight gases into liquid low-boiling point oil and low molecular-weight gases. The first and second gas/liquid separation process are connected in sequence.

11 Claims, 9 Drawing Sheets

METHOD AND APPARATUS FOR RECLAIMING OIL FROM WASTE PLASTIC

TECHNICAL FIELD

This invention concerns a method and apparatus to extract oil from waste plastic using pyrolysis. More specifically, it concerns a method and apparatus to reclaim oil either from waste plastic which has been separately collected as a portion of municipal garbage or waste plastic which has been collected as an industrial waste product. The resulting oil can then be reused as fuel.

TECHNICAL BACKGROUND

Previously, oil has been extracted from plastic separately collected as a portion of municipal garbage or waste plastic collected as an industrial waste by severing the carbon frameworks at approximately 400° C. to reduce the molecular weight, resulting in liquified oil.

The energy required by this method is approximately 500 to 1,000 kcal/kg (of plastic). To deliver this energy, the liquified plastic is circulated by means of a pump and a furnace is provided on the path of circulation.

In order to prevent thermosetting resins or hard foreign materials from causing trouble in the pump circulation line, these substances must be completely removed through pre-processing. This drives up the cost and creates a problem of economy.

Furthermore, oil obtained solely by pyrolyzing a plastic is unstable. This instability can result in coking on the walls inside the furnace pipes.

In the case of thermoplastic resins, some carbon residue is created in the process of thermal polycondensation, and these particles will be suspended in the pump circulation line. They can be separated from the liquid by passing the plastic through a filter or by centrifuging it, but there is no way to prevent some of the oil from combining with these particles and being lost. The carbon residue also could be a valuable source of energy; however, there is no way to use it efficiently.

Since this liquid oil will solidify at normal temperatures, the pump circulation line must be insulated with a steam jacket. A heavy oil lubricant is required in the processing line, which must be changed each time the line is started up or shut down. This increases the cost of operation.

DISCLOSURE OF THE INVENTION

Object of this invention

This invention was developed in consideration of the problems which occur with the prior technology. It provides a method to extract oil from waste plastic comprising thermosetting resins and solid foreign matter without a problem. This method greatly reduces the burden of pre-sorting the garbage or industrial waste.

Another objective of this invention is to provide a method and apparatus to extract oil which would reduce the incidence of coking during the process of applying energy to the waste plastic, and which would allow the solid residue of pyrolysis to be used efficiently as a heat source without having to separate it.

Yet another objective of this invention is to provide a method and apparatus to extract oil in which it is easier to start up and shut down the process in which the aforesaid waste plastic is pyrolyzed to extract its oil.

A further objective of this invention is to provide a method and apparatus to extract oil which can efficiently separate the gaseous component obtained from the pyrolyzed plastic into oils with high, and low boiling points and a low molecular-weight gas, and which can easily and efficiently yield high-quality oils with low boiling points.

Yet another objective of this invention is to provide a method and apparatus to extract oil which enables the size of the components involved in the process of pyrolyzing the aforesaid waste plastic to be reduced, and which can efficiently yield the gaseous products of pyrolysis.

Another objective of this invention is to design the pyrolysis process as discussed above using a horizontal agitation device such as a horizontal feed reactor in order to simplify and reduce the size of the pyrolysis device.

Another objective of this invention is to combine the aforesaid pyrolysis process with a dechlorination process in a single step by constructing a single mechanical agitation device to perform both processes. This will allow the size of the pyrolysis device to be greatly reduced.

Configuration

In order to achieve the objectives outlined above, this invention is designed as follows. Its first distinguishing feature is that it entails a dechlorination process prior to a pyrolysis process, which yields dechlorinated products comprising an admixture of waste plastic and sand. This process is used when oil is to be obtained by pyrolyzing waste plastics which may contain chloride compounds such as vinyl chloride. Prior to the pyrolysis process, while the waste plastic is being extruded and forced along, it is combined with heated sand and/or another additive agent. Heating the plastic to a temperature in the range between 250 and 350° C. results in a mixture of substantially dechlorinated waste plastic and sand.

The waste plastic which has been substantially dechlorinated by the aforesaid process is then subjected to the pyrolysis process. The second distinguishing feature of this invention is that this pyrolysis process entails applying heat directly to the mixture of plastic and heated sand, raising the temperature of the mixture to between 350 and 500° C., ideally between 400 and 480° C., and maintaining the mixture at this temperature to effect pyrolysis.

The third distinguishing feature of this invention is that it entails a residue incineration process to incinerate the residue of the pyrolyzed plastic. To make efficient use of the solid residue derivatives of pyrolysis, they are incinerated on a fluidized bed using pneumatically circulated sand as the medium, or on a high-speed circulation fluidized bed. Heated sand is produced, a portion of which is then returned to either the aforesaid pyrolysis process or to the dechlorination process which precedes pyrolysis. Thus the residue is incinerated through the use of recirculation.

The fourth distinguishing feature of this invention is that in order to obtain high-quality oil with a low boiling point, the product obtained from the aforesaid pyrolysis process is separated by a first separation device into a liquid oil fraction with a high boiling point, a gaseous oil fraction with a low boiling point and a low molecular-weight gas. A first process in which oils with high boiling points are returned to the aforesaid pyrolysis process is directly and serially connected to a second process in which a second separation device separates a liquid oil with a low boiling point from a low molecular-weight gas.

Another distinguishing feature of this invention is that the overall system for extracting oil by pyrolyzing waste plastics is as follows. The aforesaid processes of dechlorination, pyrolysis and incineration of residue are linked together. The first gas/liquid separation device separates the product obtained from the aforesaid pyrolysis process into a liquid oil with a high boiling point, a gaseous oil with a low boiling point and a low molecular-weight gas. After the pyrolysis process, two more processes occur: a recirculation process in which the oil with a high boiling point is recirculated to the pyrolysis process, and a separation process in which the second gas/liquid separation device separates the oil into a liquid with a low boiling point and a low molecular-weight gas.

At this point the product from the aforesaid pyrolysis process undergoes the first gas/liquid separation process, in which a cooling unit is installed above the gas/liquid interfacial unit. The product is separated into 1) a liquid with a high boiling point, 2) a gaseous oil with a low boiling point and a low molecular-weight gas. The oils with a high boiling point may be recirculated to the aforesaid pyrolysis process.

Ideally, the first and second gas/liquid separation processes should be connected in series. The aforesaid first gas/liquid separation process should entail a liquid dispersion unit which is placed above the gas/liquid interfacial unit. The liquid which is supplied to the aforesaid liquid dispersion unit should be the low-boiling point oil separated by the second separation process, preferably after it has been cooled.

Ideally, the aforesaid first and second gas/liquid separation processes should be serially connected. The aforesaid second gas/liquid separation process should utilize a tower with a plurality of gas/liquid interfacial units arrayed in the tower. The gaseous pyrolysis product of the first gas/liquid separation process should be conducted between the two gas/liquid interfacial units.

The aforesaid first gas/liquid separation process entails an interfacial gas/liquid interfacial unit and, above this unit, a liquid dispersion unit. The liquid which is supplied to this liquid dispersion unit should be the low-boiling point oil separated by the second gas/liquid separation process and then cooled.

According to this invention, the aforesaid first and second gas/liquid separation processes should be serially connected via a pipe. The chlorine-containing gas exhausted by the aforesaid dechlorination device should be conducted to the inlet of the second gas/liquid separation process.

The aforesaid second gas/liquid separation process should utilize a vertical tower comprising, from the bottom, a reboiler, a lower gas/liquid interfacial unit, an upper gas/liquid interfacial unit and a cooling unit. The gaseous pyrolyzed product of the first gas/liquid separation process may be conducted between the upper gas/liquid interfacial unit, which serves mainly to collect the low-boiling point oil, and the lower gas/liquid interfacial unit, which serves as a liquid dispersion enhancer for the low molecular-weight gas.

The aforesaid pyrolysis process should generally make use of a fluidized bed furnace to mix the plastic with heated sand, heat it directly and maintain its temperature at 350 to 500° C. The plastic could also be made to circulate by means of inert gases, but it is preferred to circulate it by a mechanical agitation device.

The aforesaid mechanical agitation device to mix the sand, additive and waste plastic could be a vertical reactor of the type shown in FIGS. 5 and 6, a rotary kiln as shown in FIGS. 7 and 8, or a horizontal feed reactor.

The use of a mechanical agitation device allows the waste plastic to be heated directly by heated sand with a relatively large surface area. Since the temperature of the plastic can be raised to between 400 and 480° C. and maintained there, the system does not experience problems due to coking on the thermally conductive surface, as occurs with the indirect heat exchanger in prior art devices. Because the sand is forcefully agitated by the mechanical agitation device of this invention, even sand with carbon particles adhering to its surface can be easily reclaimed when it is combusted in the aforesaid residue incineration process to incinerate the pyrolytic residue (i.e., the sand reclamation process). This prevents trouble before it can occur.

In the pyrolysis process employed in this invention, the additive agent and the circulating sand which has been heated to a temperature of 500 to 950° C., are mixed with the substance being processed (i.e., waste plastic), which is then maintained at a temperature between 350 and 500° C., preferably between 400 and 480° C.

An additive agent may be used in the aforesaid pyrolysis process. The function of this agent is to serve as a catalyst to accelerate the further pyrolysis of the wax produced when the waste plastic is pyrolyzed. In the past synthetic or natural zeolites have been widely used for this purpose in the petrochemical industry. Natural mordenite is a suitable choice for a catalyst.

The use of an appropriate catalyst will minimize coking caused by polycondensation which occurs simultaneously with pyrolysis.

In the aforesaid pyrolysis process effected by the aforesaid mechanical agitation device, the high-boiling point oils which are discharged from the gas outlet line and cooled to between 200 and 250° C. in the first gas/liquid separation process can be recirculated. It is therefore desirable to recirculate the high-boiling point oils via the circulation line back to the pyrolysis process.

In this way, the high-boiling point oils are heated in the pyrolysis process under the influence of the additive. The high-boiling point oils are again pyrolyzed to yield low-boiling point oils. The fraction of low-boiling point oils extracted is enhanced, and the quality and oil stability during storage are improved.

An effectively realized apparatus according to this invention would have a number of mechanical agitation devices, as described above. The mixture of heated sand and the unpyrolyzed solid (waste plastic) would be supplied to the agitation devices of each stage in succession, and the pyrolysis processes are effected in sequence. The gaseous products of these successive stages of pyrolysis could be supplied in parallel to the gas/liquid separation process.

Unpyrolyzed solid would be supplied to each of the mechanical agitation devices in sequence so that the plastic would be sufficiently pyrolyzed. This would improve the yield of gaseous product collected.

The gaseous products of the several pyrolysis stages would be supplied in parallel directly to the first gas/liquid separation process without being fed back through the mechanical agitation devices, which are used in the previous stage. This allows the products of pyrolysis to be collected more effectively.

The high-boiling point oils separated in the aforesaid first gas/liquid separation process are not supplied in parallel to each of the agitation devices. These oils are circulated back to the first-mechanical agitation device in a number of mechanical agitation devices arrayed in sequence, so that they are conveyed through one mechanical agitation device after another until they are sufficiently pyrolyzed. This method significantly improves the yield of low-boiling point oils.

This invention may also employ a method by which waste plastic and heated sand are conveyed from upstream to downstream and the plastic is pyrolyzed while being mechanically agitated. The pyrolysis device used is called a horizontal screw-type reactor. In this case, at least one line conducting the gaseous products of pyrolysis to the first gas/liquid separation process is connected to the downstream portion of the aforesaid mechanical agitation devices. The line circulating the high-boiling point oils separated in the aforesaid first gas/liquid separation process back to the aforesaid pyrolysis process is connected to the upstream side of the mechanical agitation devices.

With this invention, the dechlorinated product is conducted to the upstream portion of the aforesaid mechanical agitation devices so that by the time the plastic arrives downstream, it has received sufficient agitation. In other words, it comes out sufficiently pyrolyzed.

The high-boiling point oils circulated after the aforesaid first gas/liquid separation process are returned to a point upstream of the mechanical agitation devices in order that these oils, too, will be sufficiently pyrolyzed. This significantly increases the collection efficiency for low-boiling point oils. With another embodiment of this invention, a single mechanical agitation device can serve both to dechlorinate and pyrolyzed the plastic. When the waste plastic is mixed with heated sand, the upper space in the mechanical agitation device is reserved for gases. In the mechanical agitation device, through which the plastic can be conveyed horizontally from upstream to downstream, the aforesaid upper space is divided into upstream and downstream regions. An exhaust pipe is furnished for each region.

The mixing temperature in the upstream portion of the mechanical agitation device is kept between 250 and 350° C.; the mixing temperature in the downstream portion is kept between 350 and 500° C., preferably between 400 and 480° C. As a result, the dechlorination process can be established in the upstream portion and the pyrolysis process in the downstream portion. The product which comprises a mixture of sand and waste plastic which has been dechlorinated in the upstream portion is conveyed downstream while it is mechanically agitated. This results in the formation of gaseous high-boiling point oils, low-boiling point oils and a low molecular-weight gas which are the products of pyrolysis as well as a solid residue. There is no need for a separate line to pyrolyze the waste plastic. A single mechanical agitation device, thus, can serve both to dechlorinate and pyrolyze the plastic. This method allows the pyrolysis system to be made much smaller and requires fewer components than prior systems.

DETAILED EXPLANATION OF THE INVENTION

We shall next give a detailed explanation of this invention.

The phrase "waste plastic" which is used in this application includes most plastics which are sorted out of urban trash. Most of these will be thermoplastic resins (polyethylene, polypropylene, polystyrene, etc.), which may be mixed with some percentage of polyvinylchloride, various PETs, thermosetting resins or paper and various types of foreign matter typically found in garbage.

Much of the plastic waste typically found in industry comprises the residue from die-casting plastic products. If the waste plastic is one that contains chlorine, such as polyvinylchloride, the oil extracted by pyrolysis will be of poor quality, and the chlorine may cause the catalyst to degrade or the components to corrode. To safeguard against this, the chlorine must be separated and removed before the plastic is pyrolyzed.

Virtually all chlorine in waste plastic is contained in polyvinylchloride and polyvinylidene chloride. As is well known, this chlorine can be separated and removed as desired by raising the temperature of the plastic to between 250 and 350° C.

This invention provides a dechlorination process as a preprocessing step before pyrolysis. The preferred way to raise the temperature of the plastic to between 250 and 350° C. is to heat it directly using heated sand. Because the sand has a large surface area, it provides an extremely large heat conductive surface which can easily raise the temperature of the plastic.

In order to optimize the dechlorination rate, the dechlorination process (the first process) should be carried out by a device which can push the plastic forward in a continuous stream. A rotary kiln is ideal for this purpose.

In this process, the separated gas whose main constituent is HCl may be collected in water or in an alkaline absorption liquid, or it may be conducted to the second gas/liquid separation process, as mentioned above. The low-boiling point oils that are vaporized in the aforesaid dechlorination process may also be collected to further increase the yield of low-boiling point oil.

The dechlorinated plastic is then pyrolyzed. In the pyrolysis process, the plastic is heated directly by heated sand, which has a relatively large surface area. Specifically, the material being processed (i.e., the waste plastic) is mixed with an additive agent and circulating sand which has been heated to a temperature of 500 to 950° C. The plastic is heated to a temperature between 400 and 480° C. and maintained at that temperature. This method prevents problems due to coking on the heat conductive surfaces, as occurs with the indirect heat exchangers used in the prior art. Even if carbon particles adhere to the surface of the sand, the sand continues to circulate, and it will be combusted in the aforesaid process to incinerate the pyrolytic residue and reclaim the sand (the third process). The sand can be reclaimed easily, and trouble can be avoided.

A mechanical agitation tank which can uniformly mix the sand, the additive agent and the waste plastic is well suited for use as the pyrolysis device.

In the pyrolysis process of this invention, the additive agent and circulating sand which has been heated to a temperature of between 500 and 950° C. are mixed as needed with the substance being processed (i.e., the waste plastic). The plastic is then maintained at a temperature between 350 and 500° C., preferably between 400 and 480° C.

The additive agent is a catalyst to promote the pyrolysis of wax, which is produced when the plastic is pyrolyzed. Heretofore, synthetic or natural zeolites have been widely used for this purpose in the petrochemical industry; natural mordenite is a suitable choice.

The inventors do recognize that the coking caused by the polycondensation which occurs simultaneously with pyrolysis can be minimized by the additive agent as well, but the additive agent is not absolutely necessary.

The low molecular-weight gas within the products generated in the pyrolysis process, the gaseous low-boiling point oils (boiling point under 250° C.) and the high-boiling point oils (boiling point of 250° C. or higher) are discharged from the gas vent of the pyrolysis device. They are cooled to between 200 and 250° C. in the first gas/liquid separation process, where only the high-boiling point oils are liquified. These may then be recirculated via the circulation line back to the pyrolysis process. When the high-boiling point oils are reheated in the pyrolysis process, they are further broken down and converted to low-boiling point oils. This method increases the yield of low-boiling point oils and leads to oil of improved quality and stability under storage.

The temperature bounds for this boiling point of 250° C. may be set anywhere in the range between 200 and 400° C., as needed.

In the aforesaid first gas/liquid separation process, a cooling unit should be connected to the upper end of the gas/liquid interfacial unit. The aforesaid cooling unit may employ indirect cooling by means of cold water; or, as shall be discussed presently in regard to a preferred embodiment, it may employ direct cooling by means of the cooled low-boiling point oils.

In more concrete terms, the aforesaid first gas/liquid separation process employs two units: a gas/liquid interfacial unit, and, above this unit, a liquid dispersion unit which disperses the liquid. The liquid supplied to the aforesaid liquid dispersion unit is the low-boiling point oil which has been separated in the second gas/liquid separation process and cooled. Alternatively, a circulation path for cooling water may be provided over the gas/liquid interfacial unit.

In this invention, the separation of high-boiling point oils, low-boiling point oils and low molecular-weight gas is effected by the gas/liquid interfacial unit. This gas/liquid interfacial unit comprises a distillation column such as a filled tower or a tray tower. Above the gas/liquid interfacial unit is a liquid dispersion unit for the low-boiling point oils which have been cooled. When the low-boiling point oils separated in the second gas/liquid separation process are supplied to this liquid dispersion unit, the heat absorbed by the evaporation of the liquid low-boiling point oils will cause the vaporized high-boiling point oils to condense, thereby releasing more heat. Thus the vaporized high-boiling point oils are liquified through cooling by means of an effective heat exchange. The waxy portion (i.e., the high-boiling point oils) can be recirculated to the pyrolysis device without the possibility of being transferred to the low-boiling point oil side. Because the aforesaid high-boiling point oils are circulated efficiently back to the pyrolysis device, they can be repyrolyzed efficiently. This improves the yield of low-boiling point oils.

The first gas/liquid separation process and the second gas/liquid separation process which separates the high-boiling point oils into liquid low-boiling point oils and low molecular-weight gas, are connected in sequence. The gaseous product of pyrolysis, once it is conducted to the second gas/liquid separation process, is comprised solely of low molecular-weight gas and low-boiling point oils. Accordingly, when that gaseous product is cooled in the said second process to approximately 30° C., low-boiling point oils and low molecular-weight gas will easily be separated.

According to this invention, the high-boiling point oils resulting from the first gas/liquid separation process are recirculated to the aforesaid pyrolysis process, and the first and second gas/liquid separation processes are connected in sequence. This arrangement prevents the waxy components (the high-boiling point oils) from mixing with the low-boiling point oils separated in the said second process, thus ensuring high-quality low-boiling point oils.

According to this invention, the liquid supplied to the aforesaid liquid dispersion unit is the low-boiling point oil separated in the second gas/liquid separation process. If there are any vaporized high-boiling point oils in the low-boiling point oil which is dispersed, they can easily be liquified and collected. The cooled low-boiling point oils can be used to promote the liquefaction and circulation of the aforesaid gaseous high-boiling point oils by condensing them. The high-boiling point oils can be efficiently repyrolyzed, which enhances the yield of low-boiling point oil.

According to this invention, the separation of liquid high-boiling point oils, gaseous low-boiling point oils and low molecular-weight gas is effected by the gas/liquid interfacial unit. This gas/liquid interfacial unit comprises a distillation column such as a filled tower or a tray tower. A cooling unit is connected to the uppermost portion of this gas/liquid interfacial unit. If a small amount of high-boiling point oil manages to pass through the aforesaid gas/liquid interfacial unit, it will be completely liquified so that it can be circulated back to the pyrolysis process. The waxy portion (i.e., the high-boiling point oils) will not be allowed to transfer to the low-boiling point oil side. Because the aforesaid high-boiling point oils are circulated efficiently back to the second process, they can be repyrolyzed efficiently. This improves the yield of low-boiling point oils.

The aforesaid first gas/liquid separation process makes use of a gas/liquid interfacial unit and a liquid dispersion unit which is placed above the gas/liquid interfacial unit. The liquid which is supplied to the aforesaid liquid dispersion unit should be the low-boiling point oil separated by the second gas/liquid separation process, preferably after it has been cooled.

The second gas/liquid separation process of this invention employs an upper gas/liquid interfacial unit, which serves to collect the low-boiling point oils, and a lower gas/liquid interfacial unit, which serves to disperse the low molecular-weight gas. If there are any residual low-boiling point oils in the gas dispersed by the lower gas/liquid interfacial unit (the liquid dispersion unit for the low molecular-weight gas), they will be collected by the upper gas/liquid interfacial unit (the collector for the low-boiling point oils).

The low-boiling point oils collected in the aforesaid upper gas/liquid interfacial unit fall into the lower gas/liquid interfacial unit, which is placed directly below the upper gas/liquid interfacial unit. In the liquid dispersion unit, any residual gas is removed from the low-boiling point oils, and the low-boiling point oils are collected in the reservoir at the bottom of the unit. Both low-boiling oils and low molecular-weight gas are collected efficiently.

The aforesaid second gas/liquid separation process should utilize a vertical tower containing, from the bottom, a reboiler, a lower gas/liquid interfacial unit (the unit to disperse the low molecular-weight gas), an upper gas/liquid interfacial unit (the collection unit for low-boiling point oils), and a cooling unit. The gaseous products of the first gas/liquid separation process should be conducted between the upper gas/liquid interfacial unit (the collector for low-boiling point oils) and the lower gas/liquid interfacial unit (the dispersion unit for low molecular-weight gas).

In addition to the effects described above, the cooling unit provided on top of the upper gas/liquid interfacial unit (the collector for low-boiling point oils) assures that any vaporized low-boiling point oils which manage to pass through the upper gas/liquid interfacial unit will be fully liquified and collected. These low-boiling point oils can be collected efficiently, so that the yield is enhanced.

Since there is a reboiler at the bottom of the vertical tower, any low molecular-weight gas which is dissolved in the low-boiling point oils will be returned to the vapor state to insure that the quality of the low-boiling point oils will remain high.

The solid residue generated by the pyrolytic process (carbon), solid foreign matter and non-liquified thermosetting resins are discharged by means of a screw feeder or the like and conducted to the residue incineration process (the third process). In this process, air is introduced to create a fluidized bed using sand as the medium. The organic substances mentioned above, including those adhering to grains of sand, will be completely combusted. A portion of the sand, with its temperature maintained at 500 to 950° C., is recirculated from line 20 back to the first process, pyrolysis.

A preferred device for use in the residue incineration process is a fluidized bed suspended in a stream of air or a fluidized bed of any type which is rapidly circulated.

According to this invention, then, all three aforesaid processes, dechlorination, pyrolysis and residue incineration, use sand as the medium. This being the case, if the solid portion of the waste plastic is crushed to a diameter of not more than 100–200 mm, the line will not clog up. The only preprocessing necessary is crushing the plastic, which need not be sorted.

PREFERRED EMBODIMENTS OF THE INVENTION

In this section we shall give a detailed explanation of the invention with reference to the drawings, using preferred embodiments for the purpose of illustration. To the extent that the dimensions, materials, shape and relative position of the components described in these embodiments need not be definitely fixed, the scope of the invention is not limited to the embodiments as described herein, which are meant to serve merely as examples.

First, in order to explain the apparatus which comprise this invention, we shall discuss the configuration of the principal components used in these apparatus.

Figure 1:
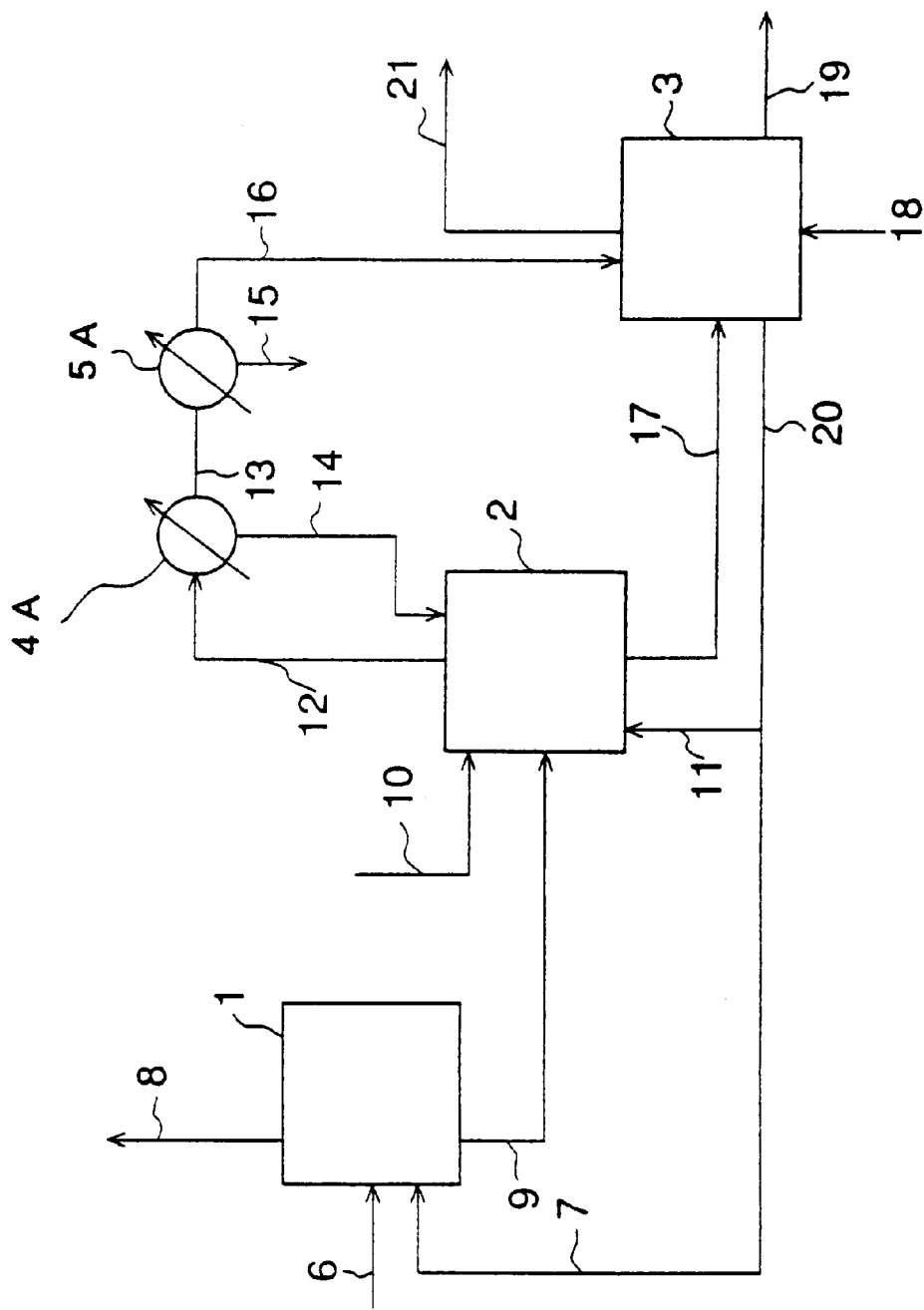
FIG. 1 is a simplified representation of an apparatus to recover oil from waste plastic which is a preferred embodiment of this invention. It uses two condensers to carry out the two gas/liquid separation processes to separate gases from liquids.

FIG. 1 is a simplified representation of an apparatus to recover oil from waste plastic which is a preferred embodiment of this invention. This apparatus uses two condensers to carry out the two processes which separate gases from liquids.

In this drawing, 1 is a rotary kiln to remove chlorides from the plastic (the dechlorination process). The waste plastic supplied by supply line 6, along with circulating sand S which has been heated to a temperature of 400–950° C., is pressurized and mixed to raise the temperature of the aforesaid plastic P to 250–350° C.

This results in the separation of more than 95% of the chlorine from the plastic. A gas whose principal component is HCl is removed via line 8, which is provided on top of kiln 1 to remove this HCl-rich gas. This gas is collected in an absorption tank using either water or an alkaline absorption liquid. The mixture of circulating sand and dechlorinated plastic (the product of the dechlorination process) is supplied to the second process, pyrolysis, via line 9, which may be a screw conveyor or the like.

In the dechlorination process, the plastic is heated directly by coming in contact with heated sand. Since the heat conductive surface area is equal to the surface area of the sand, the waste plastic can be heated easily. The device which carries out the second process, pyrolysis, comprises an agitation tank 2 which can uniformly mix the sand, an additive agent and the waste plastic. The additive agent supplied by line 10 and the circulating sand which has been heated to 500–950° C. before being supplied by line 11, are mixed together with the dechlorinated product supplied by line 9. This mixture is kept at a temperature of 350–500° C., preferably 400–480° C., and pyrolysis occurs.

The additive agent mentioned above may be a synthetic or natural zeolite, advantageously natural mordenite; however, an additive is not absolutely necessary.

In the second process, the waste plastic is heated directly by an agent with a relatively large surface area, heated sand in the form of a fluidized bed. The temperature of the plastic is easily raised to 400–480° C. and maintained there.

Particles of carbon may adhere to the surface of the sand due to the action of the agitation tank. Since the sand circulates continuously, it will be removed via line 17. In the third process, the process to incinerate the residue of pyrolysis, the carbon will be combusted and the sand regenerated. This method prevents coking and its concomitant problems.

The second gas/liquid separation process, 5A, is connected in sequence via line 13, which removes the uncondensed gases, at the outlet after the first gas/liquid separation process, 4A.

The low molecular-weight gas, gaseous low-boiling point oils (boiling point below 250° C.), and high-boiling point oils (boiling point at least 250° C.) which are among the products of the aforesaid pyrolysis process, are removed via line 12 and cooled to approximately 200–250° C. by the first gas/liquid separation unit, a condenser or the like. This causes only the high-boiling point oils to liquify. These oils are recirculated back to the second process, pyrolysis, via line 14 and/or line 12. Circulating the high-boiling point oils back through line 12 will prevent scaling on the interior of the line.

With this method, the circulating high-boiling point oils are heated again in the second process, so they are again broken down and converted to low-boiling point oils. This arrangement increases the yield of low-boiling point oils and improves the quality of the oils and their stability under storage.

The low molecular-weight gas and low-boiling point oils are obtained via the aforesaid line 13. When they are cooled to approximately 30° C. in the second gas/liquid separation process 5A, which makes use of a condenser or the like, low-boiling point oils are obtained via line 15. Any uncondensed low molecular-weight gas is transported via line 16 to the third process, residue incineration.

The solid residue (carbon) generated by the second process, along with any solid foreign matter and non-liquified thermosetting resins are discharged by means of a screw feeder or the like through line 17 and conducted to the third process, residue incineration.

Figure 9:
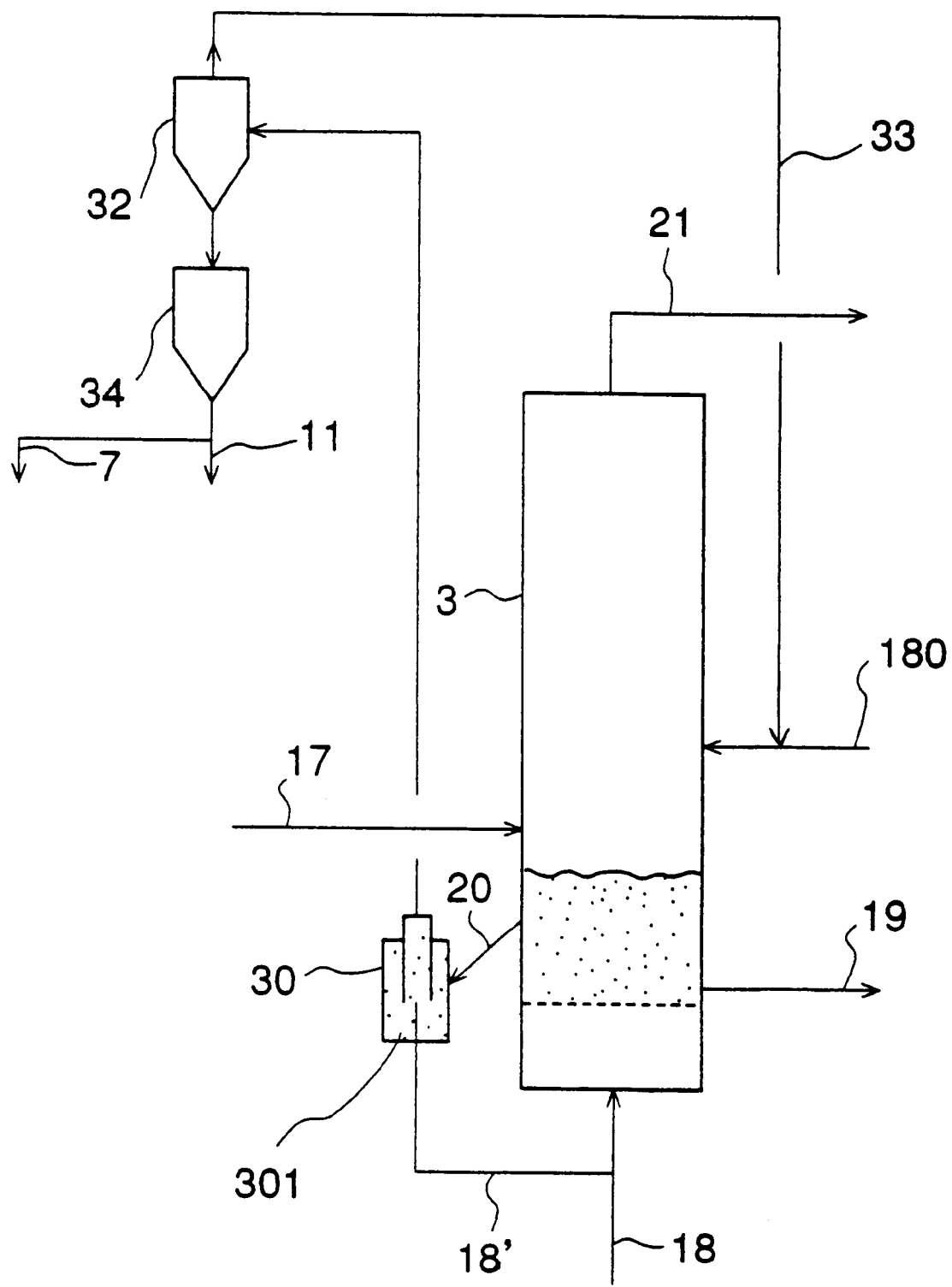
FIG. 9 is a preferred embodiment of a device for carrying out the residue incineration process used in each of the aforesaid oil reclamation apparatus. The simplified drawing shows a fluidized bed suspended in a stream of air.

The third process is carried out by means of a rapidly circulating fluidized bed or a fluidized bed suspended in an air stream, as shown in FIG. 9. As can be seen in FIG. 9, air is introduced via supply line 18 to create a fluidized bed using sand as the medium. The temperature of the residue incineration process is maintained at 500–950° C., preferably 750–950° C. Any organic materials transported via line 17 are completely combusted. By means of a second introduction of air via line 180, the exhaust gas is heated to 850–950° C. to minimize the formation of dioxins. The exhaust gas from incineration is removed via line 21 and processed as needed.

Substances which are not incinerated in the third process, such as metals or glass, are removed via line 19. A portion of the sand in the fluidized bed which has been heated to 750–950° C. is carried by gravity into negative pressure pot 30 via line 20. Together with the air delivered to air intake unit 301 via branching line 18', this sand is conducted via line 20 to cyclone 32. The heated air separated from the sand is returned via line 33 to the third process, where it contributes to combustion and helps maintain the temperature of the fluidized bed.

The sand separated by cyclone 32 goes into hopper 34, from which it can be recirculated via lines 7 and 11 to the first and second processes.

If the circulating sand is not hot enough, the low molecular-weight gas removed via line 16 or a portion of the oil from line 15 may be used as fuel for the third process.

In this embodiment, sand is used as the material for the fluidized bed in all three processes, dechlorination, pyrolysis and residue incineration. If the solid component of the waste plastic is crushed to a diameter of not more than 100–200 mm, all trouble associated with clogging can be avoided. The only preprocessing necessary is crushing the plastic, which need not be sorted.

Figure 2:
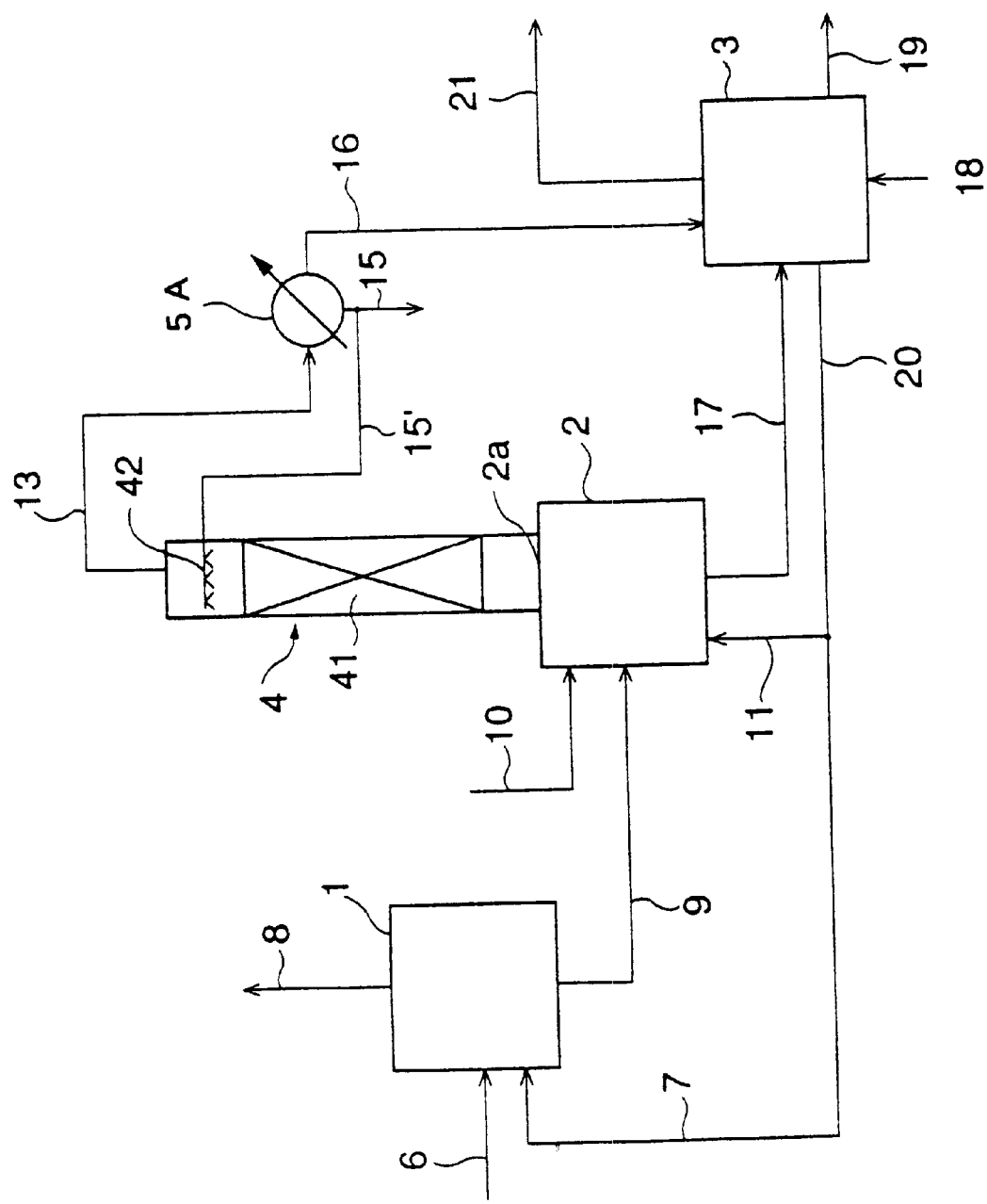
FIG. 2 is a simplified representation of an apparatus to recover oil from waste plastic which is a second preferred embodiment of this invention. It uses a distillation column and a condenser to carry out the two gas/liquid processes to separate gases from liquids.

FIG. 2 is a simplified representation of an apparatus to recover oil from waste plastic which is another preferred embodiment of this invention. It uses a distillation column or a combination of a distillation column and an evaporation tower along with a condenser to carry out the first and second gas/liquid separation processes which separate the gases from the liquids.

At this time we shall omit a discussion of those aspects of the drawing which are identical to components in FIG. 1 and give attention only to the aspects which are different.

The first gas/liquid separation process, 4B, is connected to evaporation vent 2a, the opening through which the products of second process, pyrolysis, evaporate. The second gas/liquid separation process, 5A, is connected in sequence via line 13 to the port on the first gas/liquid separation unit where the gases are vented. The low molecular-weight gas, gaseous low-boiling point oils (e.g., oils with a boiling point below 250° C.) and high-boiling point oils (e.g., oils with a boiling point of at least 250° C.) which are among the products generated by the aforesaid second process, pyrolysis, are removed through vent 2a. When they are cooled to approximately 250° C. in the first gas/liquid separation process, 4B, the condensate, which includes the high-boiling point oils, is recirculated to the second process through vent 2a.

Low molecular-weight gas and low-boiling point oils are obtained from the aforesaid line 13. They are cooled to approximately 30° C. in the second gas/liquid separation unit 5A, a condenser or the like. Low-boiling point oils are obtained from line 15. Any low molecular-weight gas which has not yet condensed is transported via line 16 to the third process, residue incineration.

The first gas/liquid separation process, 4B, comprises a liquid dispersion unit 42, which may be a spray nozzle or the like, arranged at the top of a distillation column 41, a filled tower or tray tower which serves to separate the gases from the liquids. The liquid which is supplied to the aforesaid liquid dispersion unit 42 via line 15' is the low-boiling point oil separated in process 5A and cooled as necessary by a cooling unit (not shown). A portion of the low-boiling point oil is circulated back to the first gas/liquid separation process, 4B, via line 15' through liquid dispersion unit 42. The high-boiling point oils are substantially absent from line 13.

In this embodiment, the second gas/liquid separation process, 5A, is accomplished using a condenser; however, the distillation column described earlier or an evaporation tower could also be used.

Figure 3:
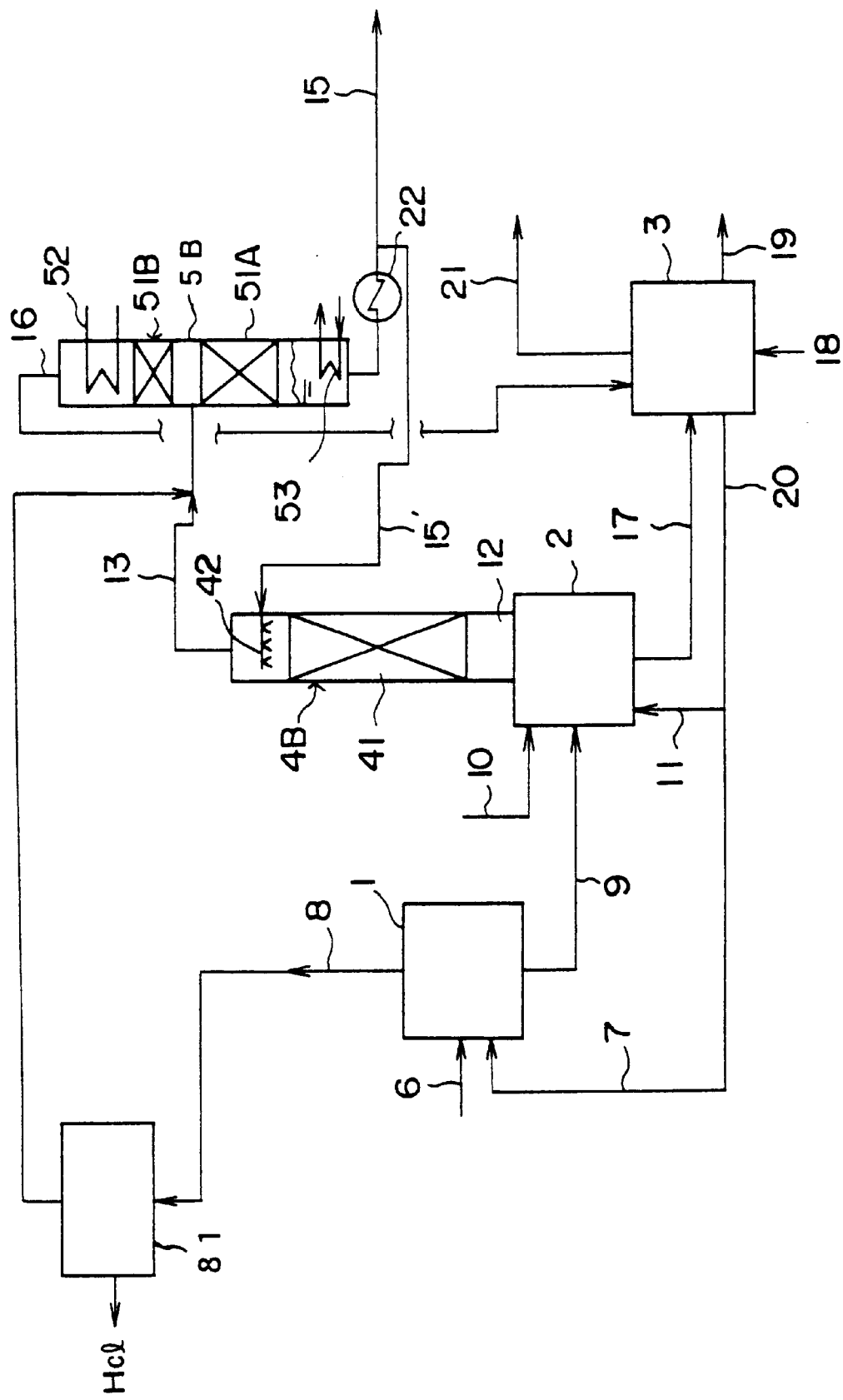
FIG. 3 is a simplified representation of an apparatus to recover oil from waste plastic which is a third preferred embodiment of this invention. It uses a distillation column or a combination of a distillation column and an evaporation tower to carry out the two gas/liquid processes to separate gases from liquids.

FIG. 3 is a simplified representation of an apparatus to recover oil from waste plastic which is another preferred embodiment of this invention. It uses a distillation column or a combination of a distillation column and an evaporation tower to carry out the two processes to separate gases from liquids.

In FIG. 3, 1 is a horizontal feed reactor which removes chlorine (i.e., the dechlorination process). Just as in FIG. 1, waste plastic and circulating sand which has been heated to a temperature of 400–950° C. are pressurized and mixed together to raise the temperature of the plastic to 250–350° C.

This results in the separation of more than 95% of the chlorine from the plastic. A gas whose principal component is HCl is removed via line 8, which is provided on top of horizontal feed reactor 1 to remove this HCl-rich gas. This gas is collected in absorption tank 81 using either water or an alkaline absorption liquid. The mixture of circulating sand and dechlorinated plastic (the product of the dechlorination process) is supplied to the second process, pyrolysis, via line 9, which may be a screw conveyor or the like.

Since in the first process the plastic is heated to a temperature of 250–350° C., the gas which is vented through line 8 will contain low-boiling point oils and low molecular-weight gas in addition to HCl. For this reason it is preferable that this gas be collected by the second gas/liquid separation process, 5B, rather than in absorption tank 81.

In this embodiment, after the HCl in line 8 has been absorbed as needed by absorption tank 81, the gas carried in the line is passed through the connection to line 13. The gas is conducted to the second gas/liquid separation process, 5B, via line 13.

It would also be acceptable for line 8 to be connected in series with line 13 so that the remaining gas in line 8 is conducted serially to line 13 after the HCl has been absorbed by absorption tank 81.

Distillation column 41, in which the first gas/liquid separation process, 4B, is carried out, is connected to the aforesaid pyrolysis process 2 via line 12. The second gas/liquid separation process, 5B, is connected serially after process 2 via line 13.

Just as in FIG. 2, the device which carries out the aforesaid first gas/liquid separation process 4B comprises a liquid dispersion unit 42, a spray nozzle or the like, arranged at the top of a distillation column 41, a filled tower or tray tower which serves to separate the gases from the liquids. The liquid which is supplied to the aforesaid liquid dispersion unit 42 via line 15' is the low-boiling point oil separated in process 5B and cooled by cooling unit 22.

According to this embodiment, the liquid supplied to the aforesaid liquid dispersion unit 42 is the low-boiling point oil separated in process 5B. Any vaporized high-boiling point oil components found in the dispersed low-boiling point oil fraction can easily be liquified and collected. Further, if the cooled low-boiling point oils are used to cool the aforesaid gaseous high-boiling point oils, the latter can be liquified and circulated more efficiently. Thus the high-boiling point oils are pyrolyzed more efficiently and more low-boiling point oils can be collected.

Low molecular-weight gas and low-boiling point oils are obtained from the outlet port of process 4B via line 13. After the gases are cooled to approximately 30° C. in the second gas/liquid separation process, 5B, low-boiling point oils are obtained from line 15. Any low molecular-weight gas which has not yet condensed is transported to the third process, residue incineration, via line 16.

The device which carries out the aforesaid second gas/liquid separation process, 5B, comprises a vertical tower containing, from the bottom, reboiler 53; lower gas/liquid interfacial unit 51A (the liquid dispersion unit for low molecular-weight gas); upper gas/liquid interfacial unit 51B (the collection unit for low-boiling point oils); and cooling unit 52. Line 13, which supplies uncondensed gas, is connected between gas/liquid interfacial units 51B and 51A.

The low-boiling point oils which are removed from the bottom of device 5B via line 15 are cooled by cooling unit 22 and reused. A portion of these oils is supplied to liquid dispersion unit 42 in the first gas/liquid separation process, 4B, via branching line 15'.

We shall now discuss the configurations of the preferred embodiments for carrying out the pyrolysis process in this system, with reference to the drawings in FIGS. 4 through 8.

Figure 4:
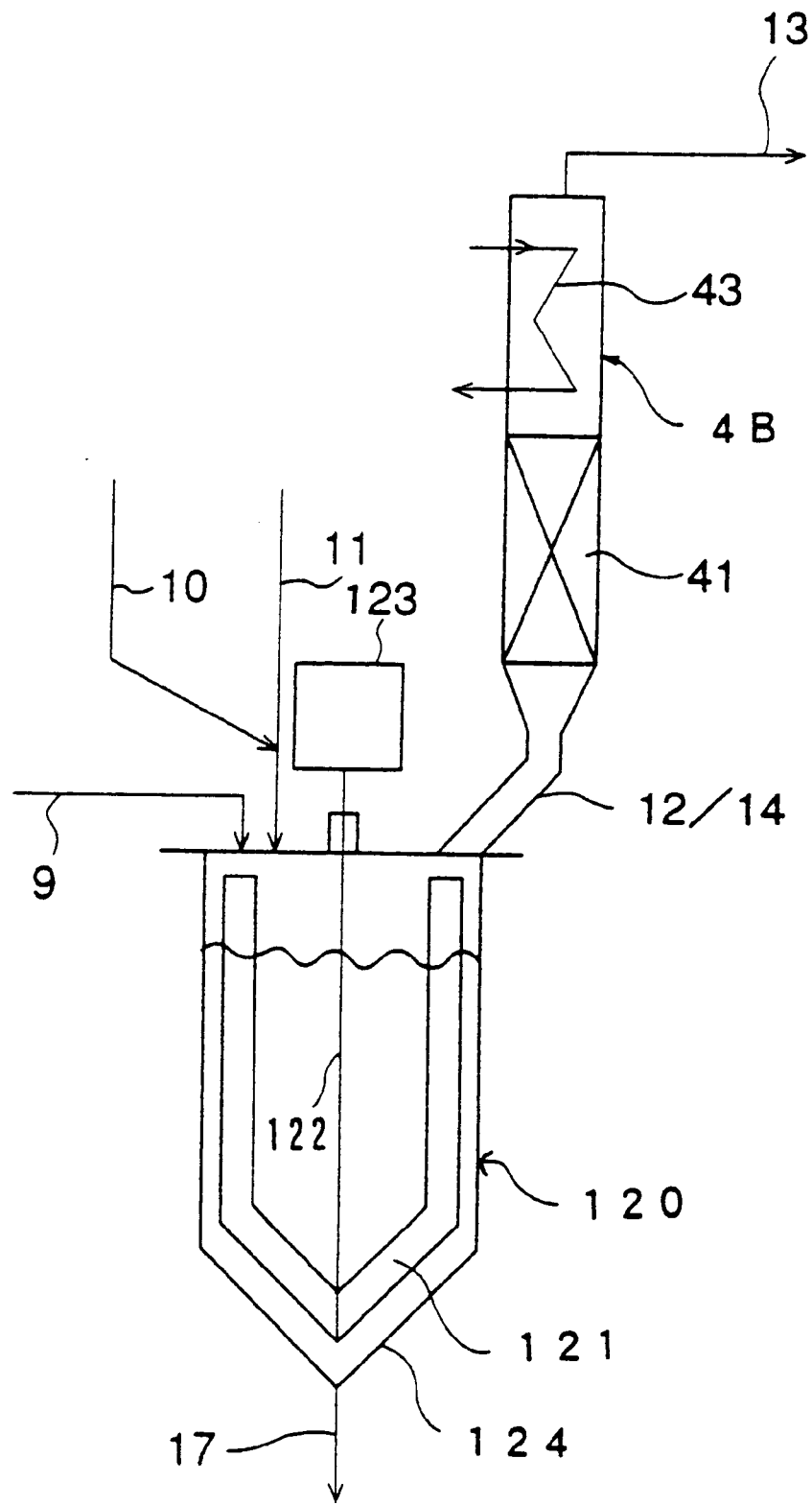
FIG. 4 is a preferred embodiment of a device to carry out the pyrolytic process used in each of the aforesaid oil reclamation apparatus. The simplified drawing shows the agitation tank and the gas/liquid separation unit for carrying out first process to separate gases from liquids, which is connected to the agitation tank.

FIG. 4 shows the aforesaid pyrolysis process. The device in which this process is carried out comprises agitation tank 120 and gas/liquid interfacial unit 41, in which the first process to separate gases and liquids is carried out. Gas/liquid interfacial unit 41 is a distillation column such as a filled or tray tower. On top of gas/liquid interfacial unit 41 is cooling unit 43.

The lower part of the aforesaid agitation tank 120 comprises conical vessel 124 and mechanical agitation device 121, which rotates along the interior wall of the said vessel 124. Mechanical agitation device 121 is rotated by motor 123, which is placed above it, by way of shaft 122.

In the aforesaid agitation tank 120, the dechlorinated plastic supplied by line 9, the additive supplied by line 10 and the circulating sand heated to 500–950° C., which is supplied by line 11, are mixed together. The mixture is maintained at a temperature of 400–480° C., and pyrolysis occurs. The gaseous products of pyrolysis are conducted to gas/liquid separation process 4B via line 12. The solid residue of pyrolysis is conducted to the third process, residue incineration, via line 17.

Line 12, which removes the products of pyrolysis, is also used as line 14 to recirculate the high-boiling point oils (the condensate) from process 4B. Recirculating high-boiling point oils through this line prevents the formation of scale on its interior.

In this embodiment, the said line 12/14 has a relatively large diameter, and a cylindrical tower rises from it vertically. In the lower portion of the said tower is gas/liquid interfacial unit 41, a filled or tray tower. In the space above gas/liquid interfacial unit 41 is cooling unit 43 or liquid dispersion unit 42.

With this arrangement, the high-boiling point oils not condensed by gas/liquid interfacial unit 41 will certainly be liquified when they come in contact with cooling unit 43. These oils are recirculated back to agitation tank 120 via line 12/14. They are heated again in the second process and again undergo pyrolysis to produce low-boiling point oils. This method further improves the yield of low-boiling point oils.

Figure 5:
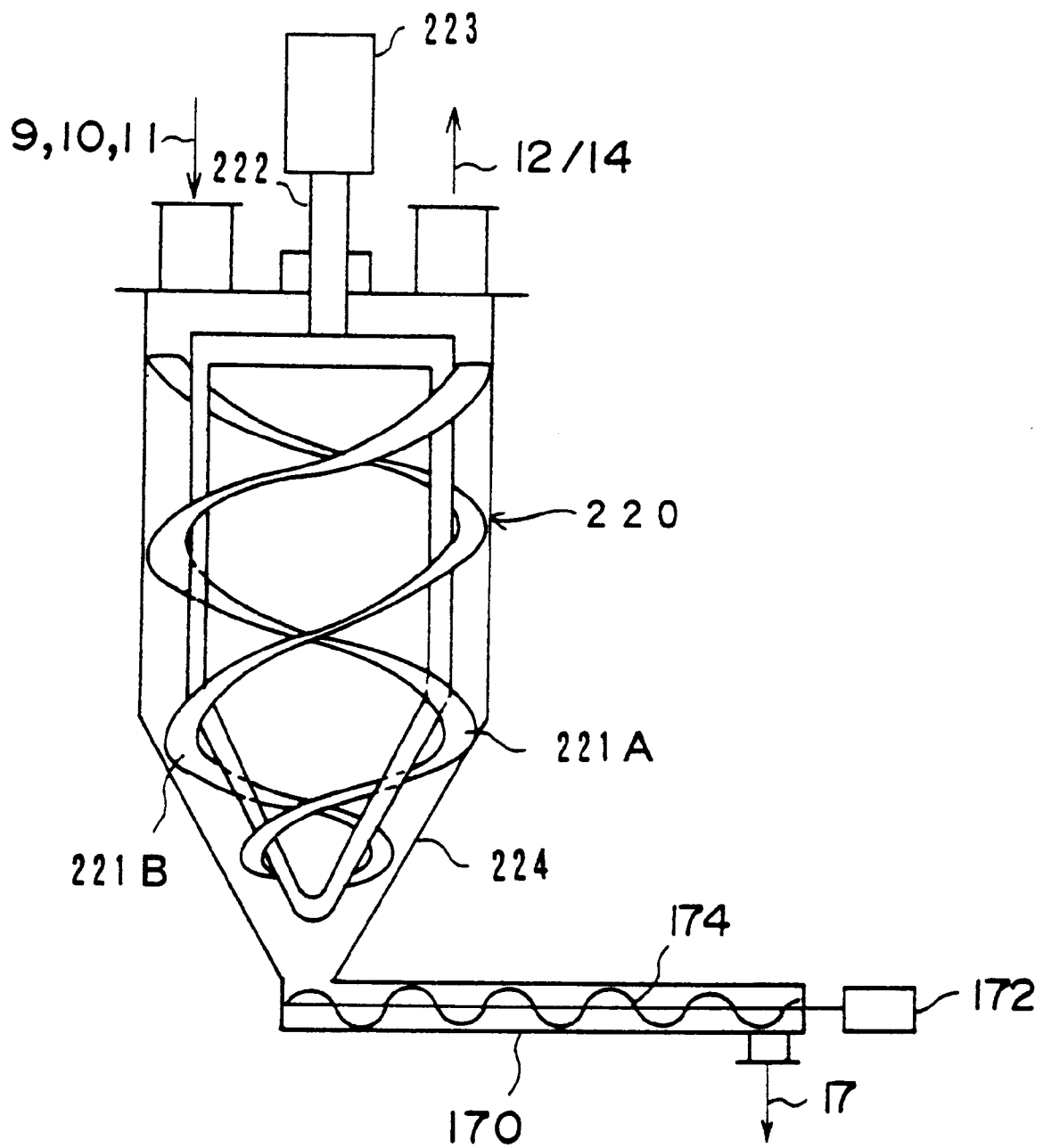
FIG. 5 is a preferred embodiment of a device for carrying out the pyrolytic process used in each of the aforesaid oil reclamation apparatus. The pyrolysis device comprises a vertical reactor.

FIG. 5 illustrates another embodiment of a pyrolysis process which uses a vertical agitation tank. The lower portion of the aforesaid agitation tank 220 comprises conical vessel 224. Mechanical agitation devices 221A and 221B are double helical ribbons which rotate along the interior wall of the said vessel 224. The aforesaid mechanical agitation devices 221A and 221B are rotated through shaft 222 by motor 223, which is placed above the shaft. In the aforesaid agitation tank 220, the dechlorinated plastic supplied by line 9, the additive supplied by line 10 and the circulating sand heated to 500–950° C., which is supplied by line 11, are mixed together. The mixture is maintained at a temperature of 400–480° C., and pyrolysis occurs. The gaseous products of pyrolysis are conducted to gas/liquid separation process 4B via line 12/14, and the high-boiling point oils separated in process 4B are returned to the agitation tank via the same line.

Using the same line as both line 12 for the removal of the products of pyrolysis and line 14 for the circulation of the high-boiling point oils condensed in process 4B has the effect of washing the line out so as to prevent the formation of scale.

The solid residue of pyrolysis is conducted to the third process, residue incineration, through line 17 after passing through pipe 170. Inside pipe 170 is screw feeder 174, which is rotated by motor 172.

Figure 6:
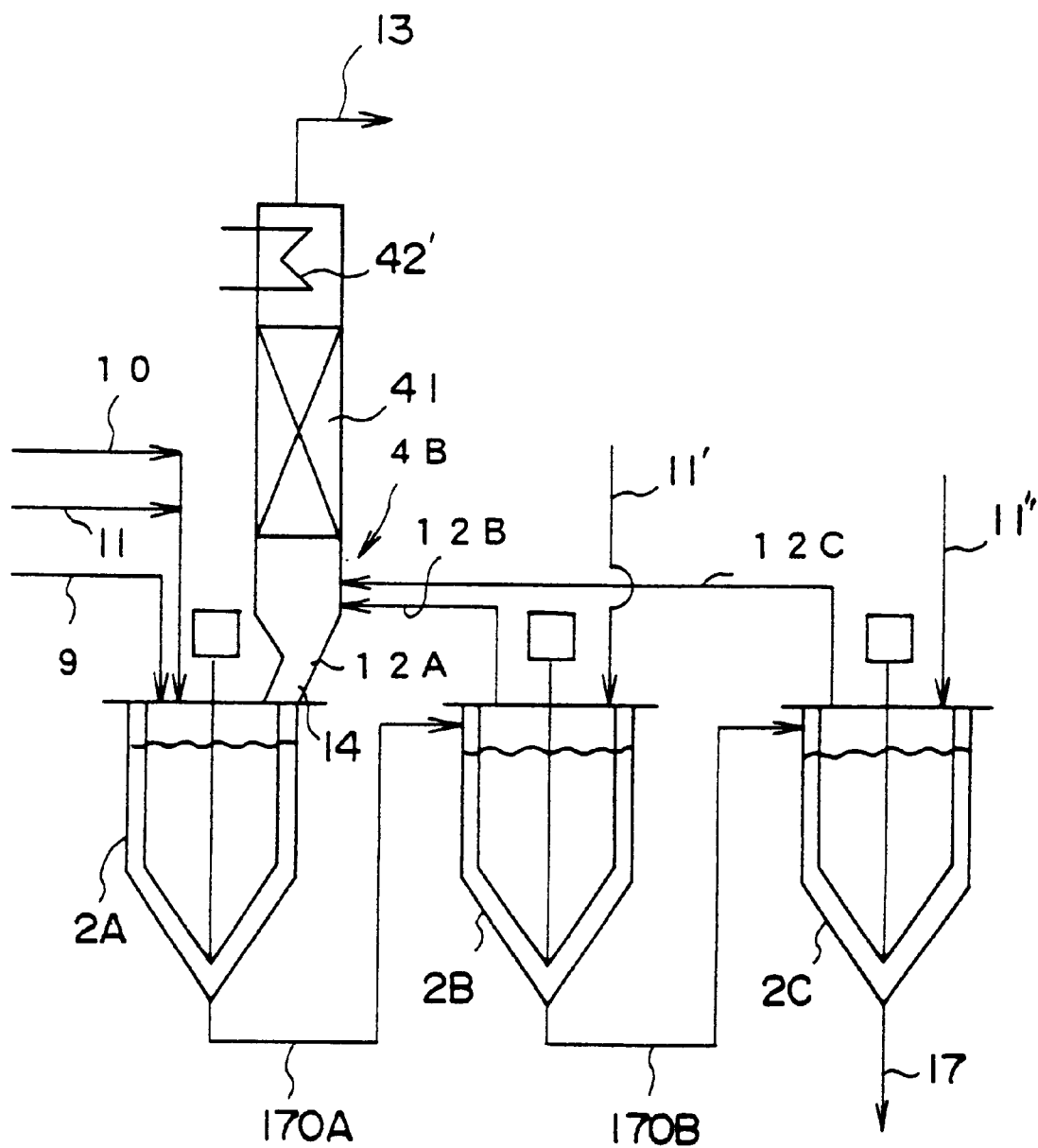
FIG. 6 is a preferred embodiment of a device for carrying out the pyrolytic process used in each of the aforesaid oil reclamation apparatus. The pyrolysis device comprises several vertical reactors.

In FIG. 6, three agitation tanks are provided: 2A, 2B and 2C. Unpyrolyzed solids are supplied, along with heated sand, in sequence to the three mechanical agitation devices, starting with tank 2A. They are fed from tank 2A to tank 2B and from there to tank 2C through pipes 170A and 170B, both of which are equipped with screw feeders as shown in FIG. 5. Pyrolysis is induced, and the gaseous products are conducted in parallel to gas/liquid separation process 4B via lines 12A, 12B and 12C on tanks 2A, 2B and 2C, respectively.

Since the unpyrolyzed solids are supplied sequentially to three separate agitation tanks, 2A, 2B and 2C, and pyrolysis is induced three times, the yield of gaseous products is improved.

The gaseous products of pyrolysis do not go back through tanks 2A and 2B, but are supplied in parallel (i.e., directly) to gas/liquid separation process 4B via lines 12A, 12B and 12C. This arrangement allows the products to be captured more efficiently.

In this embodiment, line 12A has a relatively large diameter, and its upper end is connected directly to the bottom of the distillation column in which gas/liquid separation process 4B is carried out. Since line 12A functions as the recirculation line for process 4B, the high-boiling point oils separated in process 4B are recirculated back only to tank 2A, the first of the series of agitation tanks.

As a result of this arrangement, the high-boiling point oils which are circulated are supplied sequentially to tanks 2A, 2B and 2C. They are pyrolyzed in each tank to improve the yield of low-boiling point oils. 11, 11' and 11" are the supply lines which bring the heated sand to agitation tanks 2A, 2B and 2C, respectively.

Figure 7:
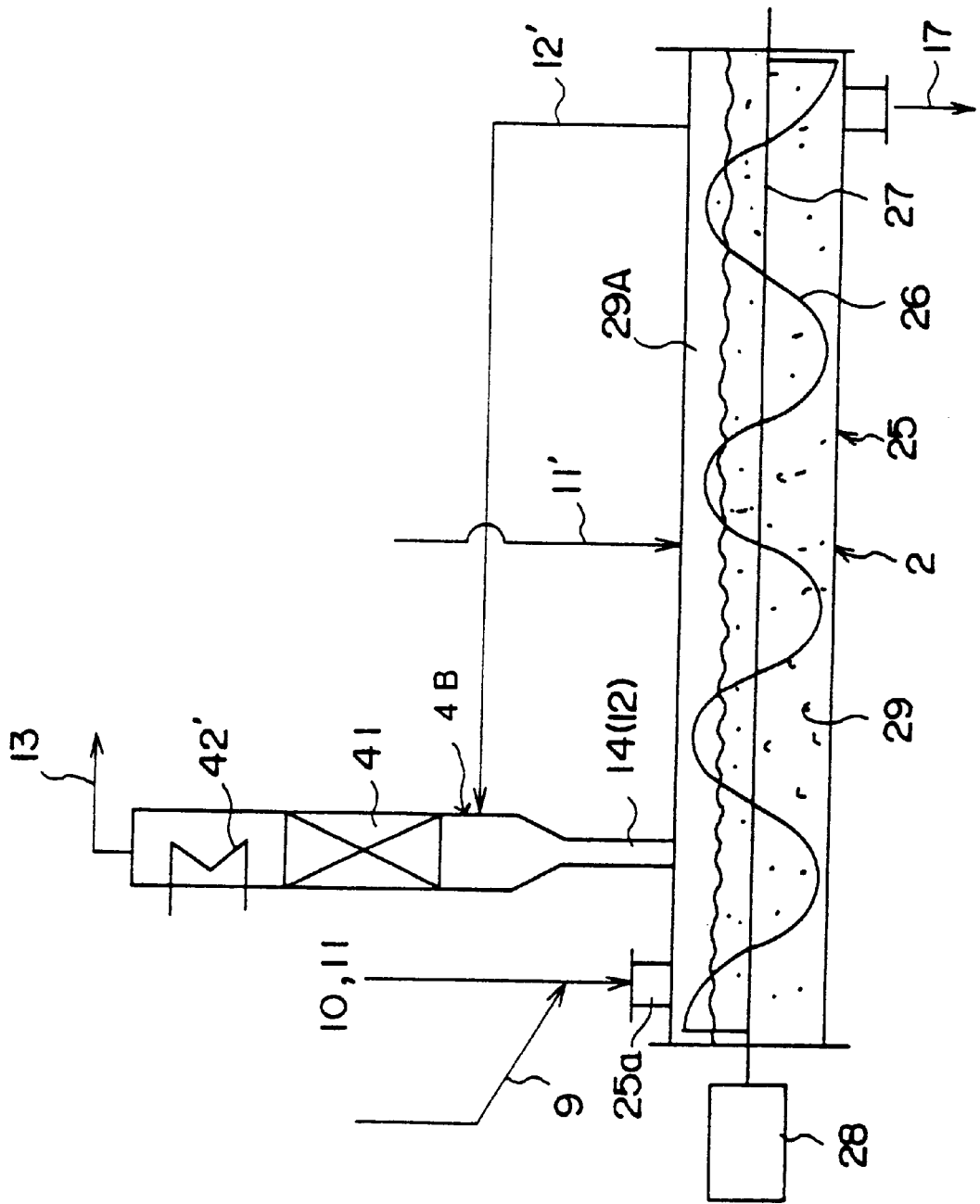
FIG. 7 is a preferred embodiment of a device for carrying out the pyrolytic process used in each of the aforesaid oil reclamation apparatus. The pyrolysis device comprises a horizontal agitation tank.

FIG. 7 depicts a reactor-type horizontal agitation tank which is another preferred embodiment for carrying out the pyrolysis process. Agitation tank 25 induces pyrolysis while the waste plastic and heated sand are being conveyed from the upper (left) to the lower (right) portion of the tank and are simultaneously being mechanically agitated. It may, for example, have two shafts which rotate in the same direction in a tank whose cross section is shaped like a FIG. 8 (eight). A number of thick, screw-shaped eccentric discs (rotors) are attached to each of the rotating shafts. When the motor rotates, the rotors also rotate. The mixture in tank 25 may be conveyed down along the length of the tank while being agitated by the rotors; or a screw feeder may be rotated by motor 28 and rotating shaft 27, as in screw feeder 26.

The additive supplied by line 10, the dechlorinated plastic supplied by line 9 and the circulating sand heated to a temperature of 500–950° C. which is supplied by line 11 are delivered through inlet 25a on the upper portion of the agitation tank 25. The circulating sand is also delivered and mixed in by way of line 11' in order to make the temperature of all the sand uniform. The mixture is maintained at a temperature of 400–480° C. to allow pyrolysis to occur. The gaseous products of pyrolysis are conducted to gas/liquid separation process 4B by way of line 12'. The high-boiling point oils separated in process 4B are returned through line 14 (12).

The volume of mixture 29 which is fed into the tank and the volume of non-pyrolyzed solids which are discharged from it are controlled so that a space 29A remains in the upper portion of the tank into which the gaseous products of pyrolysis can move.

The bottom of the distillation column in which gas/liquid separation process 4B is carried out, is directly connected to the top of circulation line 14, which leads out of the top of the agitation tank 25. Thus line 14 also functions as line 12, the supply line for the products of pyrolysis to the gas/liquid separation process 4B.

In this embodiment, line 12', which also conducts gaseous products of pyrolysis to gas/liquid separation process 4B, may also be connected to the downstream portion of agitation tank 25.

With this embodiment, the dechlorinated plastic and/or the additive is introduced into the upstream portion of the horizontal agitation tank, and it is copiously agitated as it is conveyed downstream. In other words, the mixture is adequately pyrolyzed by the time the products of pyrolysis are removed via the discharge line in the downstream portion of the tank.

The high-boiling point oils circulated from the aforesaid gas/liquid separation process 4B are returned to the upstream portion of horizontal agitation tank 25 via line 14, so they too are adequately pyrolyzed. This arrangement further enhances the yield of low-boiling point oils.

Figure 8:
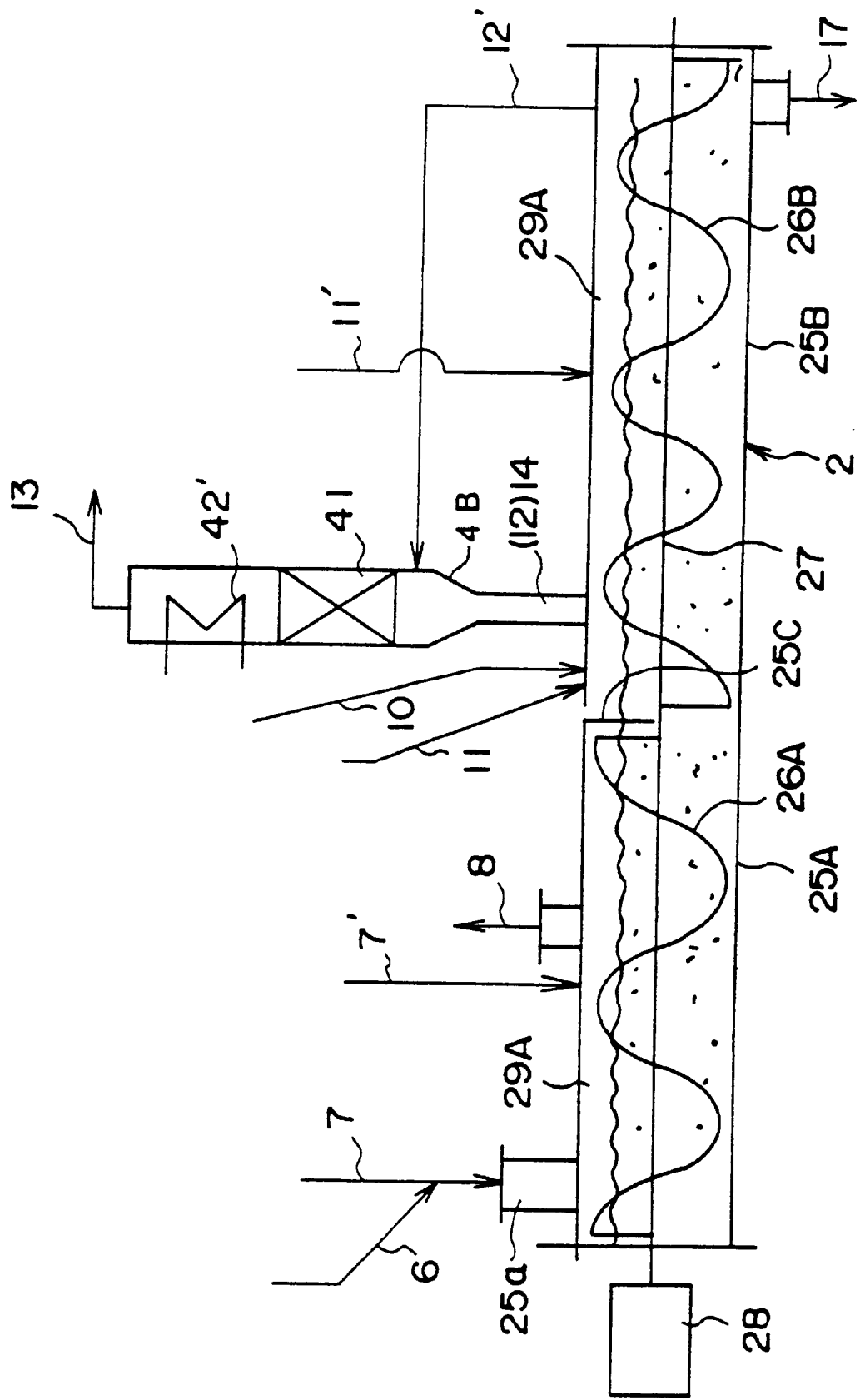
FIG. 8 is a preferred embodiment of a device for carrying out the dechlorination and pyrolytic process used in each of the aforesaid oil reclamation apparatus. The horizontal agitation tank is divided into two sections for carrying out the two process stages as a single continuous process.

FIG. 8 shows a device in which the dechlorination process is carried out as part of the pyrolysis process. It comprises two horizontal reactors as described above or two screw feeders. The horizontal reactors or screw feeders 26A and 26B convey the mixture inside the horizontal agitation tank 2 (25A and 25B) down the length of the tank while it is agitated by a rotor. This aspect of the device is identical to FIG. 7. However, the gas is sealed in the central portion, and a partition, 25C, insures that the sand will flow into the lower portion of the tank. The partition divides the space for gas at the top of the tank (29A) between the upstream and downstream regions.

The waste plastic and circulating sand which has been heated to 400–950° C. are introduced through port 25a in the upstream portion 25A by way of supply lines 6 and 7.

Heated sand is also introduced into the middle of upstream portion 25A via supply line 7' as needed to maintain a uniform heat distribution. The plastic and sand are pushed and mixed together to raise the temperature of the plastic to 250–350° C.

This results in the separation of more than 95% of the chlorine from the plastic. The HCl-rich gas can be removed via line 8 on the downstream portion of segment 25A.

The material being processed, which comprises a mixture of sand and plastic from which the chlorine has largely been removed in the aforesaid portion of segment 25A, is conveyed to the downstream portion of the tank through an opening at the bottom of partition 25C. In the upstream portion of segment 25B, circulating sand which has been heated to 500–950° C. is introduced into the mixture along with an additive agent as needed. (The agent is not absolutely necessary.) These substances are introduced through a port on the upstream portion of segment 25B via lines 10 and 11. The heated sand is also supplied to the center of that segment of the tank via line 11'.

The plastic is maintained at a temperature of 400–480° C. to induce pyrolysis. The gaseous products of pyrolysis are conducted to gas/liquid separation process 4B through line 12'. The high-boiling point oils separated in process 4B are returned via line 14 (12).

The bottom of the distillation column in which process 4B is carried out is serially connected via line 14 to the top of the upstream portion of segment 25B.

In the embodiments pictured in FIGS. 6 through 8, there is a cooling coil 42' in place of the liquid dispersion unit on top of gas/liquid interfacial unit 41 in the aforesaid gas/liquid separation process 4B. This arrangement insures that the high-boiling point oils will recirculate.

With this embodiment, the plastic is dechlorinated in the upstream portion 25A and pyrolyzed in the downstream portion 25B. The material being processed, which comprises a mixture of sand and plastic from which the chlorine has largely been removed in segment 25A, is conveyed to the downstream portion, 25B. In segment 25B gaseous products, namely gaseous high and low-boiling point oils and low molecular-weight gas, and solid residue are formed as the waste plastic and heated sand are conveyed downstream while being mechanically agitated to induce pyrolysis.

EFFECTS OF THE INVENTION

As has been discussed above, this invention concerns the reclamation of oil from waste plastic. The system employed can cope with an admixture of solid foreign matter. It avoids the need for presorting the plastic and simplifies continuous long-term operation as well as start-up and shut-down by minimizing coking. Insofar as it allows the efficient use of the residue as a heat source and increases the yield of high-quality oil with a low boiling point, this invention is extremely beneficial to society.

With any of the embodiments discussed herein, the device which carries out the pyrolysis process is smaller than in the prior art, and is more efficient at obtaining the gaseous products of pyrolysis.

With the embodiment shown in FIG. 3, a horizontal-type agitation device such as a horizontal feeder reactor is used to induce pyrolysis. Thus the device which carries out the pyrolysis process is smaller than in the prior art, and is more efficient at obtaining the gaseous products of pyrolysis.

With the embodiment shown in FIG. 8, both the dechlorination and pyrolysis processes are carried out in a single agitation tank, so there is no need for interconnection lines. The device is significantly smaller than those of the prior art, and it requires far fewer components.

We claim:

1. A method for reclaiming oil by pyrolysis from waste plastic comprising:

performing a dechlorination process;

performing a Pyrolysis process after the dechlorination process, said pyrolysis process comprising directly heating dechlorinated waste plastic by mixing with heated sand and optionally an additive agent, and maintaining said dechlorinated waste plastic at a temperature of 350–500° C., resulting in pyrolyzed products, said pyrolysis process being carried out in a plurality of mechanical agitation devices arranged in sequence so as to pyrolyze said dechlorinated waste plastic continuously; and conducting gaseous products obtained in said plurality of mechanical agitation devices in parallel to a gas/liquid separation process which follows said pyrolysis process.

2. A method for reclaiming oil by pyrolysis from waste plastic according to claim 1, wherein said gas/liquid separation process comprises:

separating said gaseous products into liquid high-boiling point oil, gaseous low-boiling point oil and low molecular-weight gas; and recirculating said liquid high-boiling point oil to a first mechanical agitation device of plurality of said mechanical agitation devices arranged in sequence.

3. A method for reclaiming oil from waste plastic by pyrolysis comprising an incineration process which comprises the steps of:

providing heated sand by incinerating a solid residue of a pyrolyzed waste plastic on a fluidized bed using pneumatically circulated sand as a medium, or on a high-speed circulation fluidized bed; and recirculating a portion of said heated sand to a pyrolysis process or a preceding dechlorination process.

4. A method for reclaiming oil from waste plastic by means of pyrolysis, comprising:

a dechlorination process to heat said waste plastic to a temperature of approximately 250–350° C. by mixing with heated sand and optionally an additive agent, resulting in an admixture of substantially dechlorinated waste plastic and sand;

a pyrolysis process to heat said admixture of substantially dechlorinated waste plastic and sand by mixing with said heated sand and optionally an additive agent to a temperature of approximately 350–500° C., resulting in gaseous pyrolysis mixture products of gaseous high and low-boiling point oils and low molecular-weight gas, and a residual mixture product of solid residue and sand;

a first gas/liquid separation process to separate said gaseous pyrolysis mixture products obtained by said pyrolysis process into liquid high-boiling point oil, gaseous low-boiling point oil and low molecular-weight gas, and to recirculate said liquid high-boiling point oil to said pyrolysis process;

a second gas/liquid separation process to separate said gaseous low-boiling point oil and low molecular-weight gas into liquid low-point oil and low molecular-weight gas; and an incineration process to incinerate said residual mixture products of solid residue and sand obtained by said pyrolysis process, and said low molecular-weight gas obtained by said second gas/liquid separation process on a fluidized bed using pneumatically circulated sand as a medium, or on a high-speed circulation fluidized bed resulting in a heated sand, and to recirculate a portion of said heated sand to said dechlorination process and said pyrolysis process.

5. A method for reclaiming oil from waste plastic by means of pyrolysis which comprises a pyrolysis process in which said waste plastic is mixed with heated sand and optionally an additive agent, directly heated to a temperature of 350–500° C. and maintained at said temperature until said pyrolysis occurs, further comprising a separation process, said separation process comprising:

a first gas/liquid separation process to separate gaseous pyrolysis mixture products obtained by said pyrolysis process into liquid high-boiling point oil, gaseous low-boiling point oil and low molecular-weight gas, and to recirculate said liquid high-boiling point oil to said pyrolysis process; and a second gas/liquid separation process to separate said gaseous low-boiling point oil and low molecular-weight gas into liquid low-boiling point oil and low molecular-weight gas, which is connected in series with said first gas/liquid separation process;

wherein said first gas/liquid separation process comprises a gas/liquid interfacial unit and a liquid dispersion unit for dispersing a liquid, said liquid dispersion unit being located above said gas/liquid interfacial unit, and said liquid supplied to said liquid dispersion unit is the liquid low-boiling point oil separated in said second gas/liquid separation process which has been cooled.

6. An apparatus for reclaiming oil from waste plastic, which comprises a pyrolysis device for mixing waste plastic which is substantially free of chlorine compounds, either as a result of preprocessing or because of the original composition of said waste plastic, with heated sand and optionally an additive agent, and heating to a temperature of 350–500° C., resulting in formation of pyrolysis products comprising gaseous high and low-boiling point oils and low molecular-weight gas and a solid residue, further comprising:

a first gas/liquid separation device to separate said pyrolysis products obtained by said pyrolysis device into liquid high-boiling point oil, gaseous low-boiling point oil and low molecular-weight gas, and to recirculate said liquid high-boiling point oil to said pyrolysis process; and a second gas/liquid separation device to separate said gaseous low-boiling point oil and low molecular-weight gas into liquid low-boiling point oil and low molecular-weight gas, which is connected in sequence to said first gas/liquid separation device;

wherein said second gas/liquid separation device comprises a tower with a plurality of gas/liquid interfacial units arranged in said tower, and conducts said gaseous low-boiling point oil and low molecular-weight gas obtained in said first gas/liquid separation device between said plurality of gas/liquid interfacial units.

7. An apparatus for reclaiming oil from waste plastic according to claim 6, wherein said second gas/liquid separation device comprises a vertical tower containing, from the bottom, a reboiler, a lower gas/liquid interfacial unit, an upper gas/liquid interfacial unit, and a cooling unit, and conducts said gaseous low-boiling point oil and low molecular-weight gas separated by said first gas/liquid separation unit between said upper gas/liquid interfacial unit which functions mainly to collect low-boiling point oil, and said lower gas/liquid interfacial unit which functions to disperse said low molecular-weight gas.

8. An apparatus for reclaiming oil from waste plastic according to claim 6, wherein said first gas/liquid separation device comprises a gas/liquid interfacial unit and a liquid dispersion unit for dispersing a liquid, said liquid dispersion unit being located above said gas/liquid interfacial unit, and said liquid supplied to said liquid dispersion unit is said liquid low-boiling point oil which has been separated in said second gas/liquid separation unit and cooled.

9. An apparatus for reclaiming oil from waste plastic, comprising:

a dechlorination device to heat said waste plastic to a temperature of approximately 250–350° C., resulting in an admixture of substantially dechlorinated waste plastic;

a pyrolysis device to heat said admixture of substantially dechlorinated waste plastic by mixing with heated sand and optionally an additive agent to a temperature of approximately 350–500° C., resulting in gaseous pyrolysis mixture products of gaseous high and low-boiling point oils and low molecular-weight gas, and a residual mixture product of solid residue and sand;

a first gas/liquid separation device to separate said gaseous pyrolysis mixture products obtained by said pyrolysis process into liquid high-boiling point oil, gaseous low-boiling point oil and low molecular-weight gas, and to recirculate said liquid high-boiling point oil to said pyrolysis device; and a second gas/liquid separation device to separate said gaseous low-boiling point oil and low molecular-weight gas into liquid low-boiling point oil and low molecular-weight gas which is connected in series with the first gas/liquid separation device;

wherein chlorine-rich gas exhausted from said dechlorination device or a residue of said chlorine-rich gas from which chlorine compounds have been removed is conducted to an entry port of said second gas/liquid separation device.

10. An apparatus for reclaiming oil from waste plastic, comprising:

a pyrolysis device comprising a mechanical agitation device for agitating and conveying said waste plastic and heated sand from an upstream portion to a downstream portion of said pyrolysis device, whereby a gaseous pyrolysis mixture products of gaseous high and low-boiling point oils and low molecular-weight gas, and a solid residue of pyrolysis are formed; and a gas/liquid separation device to separate said gaseous pyrolysis mixture products obtained by said pyrolysis device into liquid high-boiling point oil, gaseous low-boiling point oil and low molecular-weight gas, and to recirculate said liquid high-boiling point oil to said pyrolysis device;

wherein at least one line which conducts said gaseous pyrolysis mixture products to said gas/liquid separation device is connected to said downstream portion of said pyrolysis device, and a line which circulates said high-boiling point oil to said pyrolysis device is connected to said upstream portion of said pyrolysis device.

11. An apparatus for reclaiming oil from waste plastic, comprising:

a mechanical agitation device which mixes said waste plastic with heated sand and conveys the resulting admixture horizontally from an upstream portion of said apparatus to a downstream portion of said apparatus while allowing a top region of said upstream and downstream portions to remain free to contain gaseous products, wherein said top region of said mechanical agitation device is partitioned between upstream and downstream regions, and said upstream region is provided with a first exhaust path, and said downstream region is provided with a second exhaust path;

said upstream portion of said mechanical agitation device is kept between 250 and 350° C., and said downstream portion is kept between 350 and 500° C.; and said upstream portion of said mechanical agitation device dechlorinates said admixture, and said downstream portion pyrolyzes the dechlorinated admixture, resulting in gaseous pyrolysis mixture products of gaseous high and low-boiling point oils and low molecular-weight gas, and a solid pyrolysis residue.

* * * * *